Figure 1:
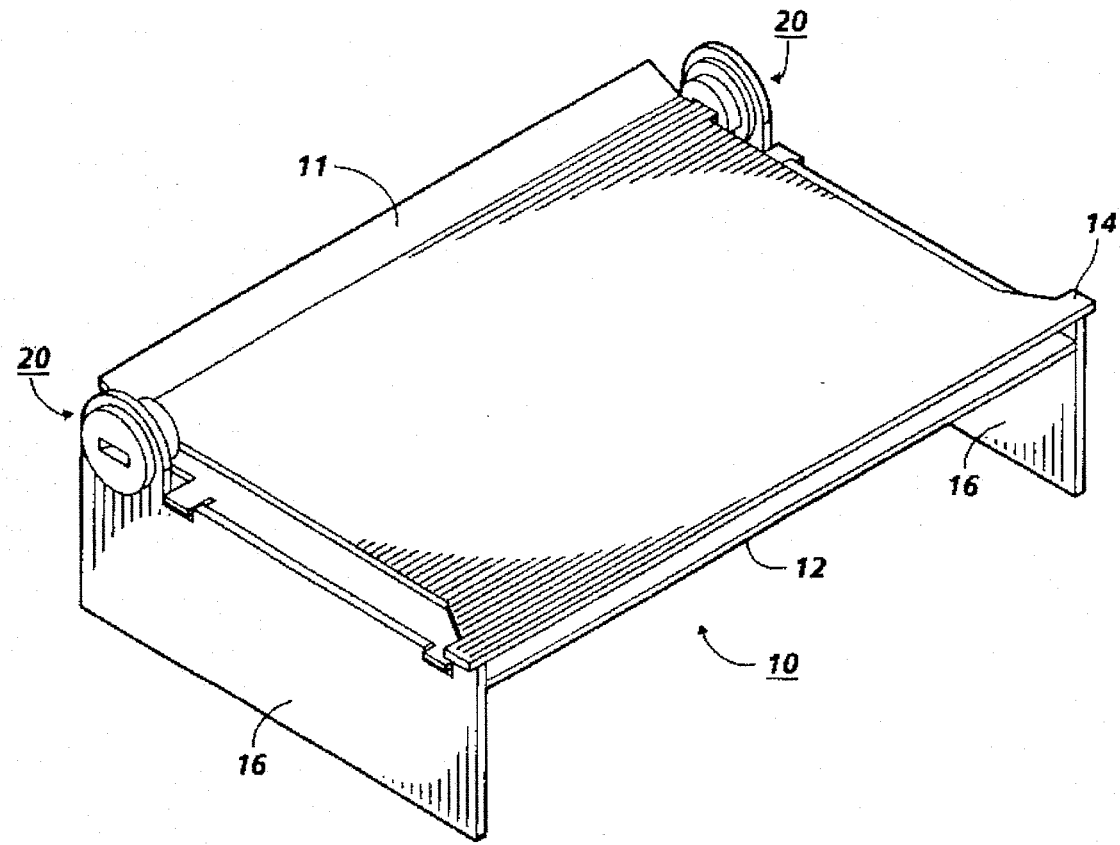

United States Patent [19]
Docteur

[11] Patent Number: 5,537,713
[45] Date of Patent: Jul. 23, 1996

[54] PIVOT BUSHING

[76] Inventor: Terrence R. Docteur, 5157 Rte. 64, Canandaigua, Ontario County, N.Y. 14424

[21] Appl. No.: 358,439

[22] Filed: Dec. 19, 1994

[51] Int. Cl.⁶ .................................................. B65D 55/00
[52] U.S. Cl. ........................................... 16/2; 403/71
[58] Field of Search ................................ 16/2, 260, 262, 16/265, 268, 271, 273, 342; 384/439, 438, 276, 295, 903; 403/71, 68

[56] References Cited

U.S. PATENT DOCUMENTS

| | | | |
|---|---|---|---|
| 2,188,596 | 1/1940 | Hobert | 16/2 |
| 3,628,786 | 12/1971 | Maloney et al. | 271/57 |
| 4,502,796 | 3/1985 | Wilczewski et al. | 384/439 |
| 4,887,331 | 12/1989 | Thomas | 16/2 |
| 5,104,190 | 4/1992 | Siegrist | 297/362 |
| 5,178,470 | 1/1993 | Unick | 384/276 |

FOREIGN PATENT DOCUMENTS

| | | | |
|---|---|---|---|
| 86766 | 4/1993 | Japan | 16/342 |
| 2047327 | 11/1980 | United Kingdom | 16/273 |

*Primary Examiner*—Chuck Y. Mah

[57] ABSTRACT

A pivot bushing including a rotatable body defining a pivot slot for receiving a pivot tab from a pivoting member. The pivot bushing further includes a groove situated along a peripheral surface for receiving a securing member to secure the pivot bushing into position in the frame assembly. The pivot bushing is insertably mounted in a pivot aperture while remaining rotatable therein, for providing secure pivotable movement of a member relative to a fixed frame assembly.

12 Claims, 2 Drawing Sheets

PIVOT BUSHING

The present invention relates to a pivot bushing for providing a secure pivoting mechanism in a pivotable assembly and, in particular, a bushing for use in a sheet transport baffle having a pivoting paper path jam access feature, commonly found in the sheet feeding apparatus of an electrostatographic printing machine.

Many applications exist for mounting a pivotable component in an assembly. For example, in a typical electrostatographic printing machine, a sheet transport baffle generally includes a pair of spaced plate members for for guiding a sheet of copy substrate material therebetween, wherein at least one baffle plate member is pivotably mounted for providing access to the interior of the sheet transport baffle for clearing paper jams and the like. Traditional systems for providing the pivoting mechanism for jam access sheet transport baffles require specifically configured cooperative bends, curves or other formations in the baffle member or the frame to which the pivoting baffle member is mounted, wherein the formations may provide means for receiving pins, shafts, or bearings which, in turn, are mounted into the sheet transport assembly to provide a pivotable hinge-type feature.

While various configurations exist for implementing such a pivoting mechanism in a sheet transport baffle apparatus, known configurations typically provide some amount of clearance space between the pivoting baffle member and a fixed frame for enabling the proper swivel operation of the pivoting baffle member without the possibility of binding. This clearance space, however small, tends to allow for lateral movement of the pivoting baffle member relative to the frame, resulting in a looseness in the pivoting mechanism which can hamper the pivotable movement between components and may otherwise lead to malfunctions. The present invention provides a pivot bushing which may be firmly secured in a pivoting mechanism for eliminating problems associated with a loosely mounted pivotable assembly.

The following disclosures may be relevant to various aspects of the present invention: U.S. Pat. No. 3,628,786, Maloney et al., issued Dec. 21, 1971; U.S. Pat. No. 4,887,331, Thomas, issued Dec. 19, 1989; U.S. Pat. No. 5,104,190, Siegrist, Apr. 14, 1992.

The portions of the foregoing disclosures may be briefly summarized as follows:

U.S. Pat. No. 3,628,786 discloses a xerographic reproducing apparatus including a front face having a fixed housing portion and a pivotable housing portion, wherein the pivotable portion has an aperture for receiving the leading edge of a document to be copied. Movement of the pivotable portion gives an operator access to the interior of the document handling apparatus for the clearing of jams.

U.S. Pat. No. 4,887,331 discloses a self-retained, one piece pivot bushing comprising a tubular body defining a bore adapted to receive a pivot pin, wherein the body includes a radially enlarged peripheral flange and at least one resilient finger extending radially outwardly from one end of the body, facing toward the peripheral flange. The free end of each finger is actually spaced from the annular surface of the peripheral flange so as to receive an apertured support panel therebetween. The tubular body also includes a radially expanded shoulder adjacent the peripheral flange and having a periphery formed with a cone surface dimensioned to matingly engage with the aperture in the support panel in a self centered manner.

U.S. Pat. No. 5,104,190 discloses a bushing for reducing lateral looseness in a pivot system including a pivoting member mounted between a pair of support plates. The bushing is placed between one support plate and the pivoting member in an interference fit relationship to provide a retaining force on the pivoting member to hold it laterally in place. By using a compressible nylon having high lubricity, excessive wear of the bushing is eliminated and binding of the pivot system during operation is precluded.

In accordance with one aspect of the present invention, there is provided a pivot bushing for providing a secure pivot mechanism in a pivotable assembly including a support frame defining a pivot aperture. The pivot bushing is comprised of a rotatable body defining a pilot slot for cooperative engagement with a pivoting member with the rotatable body being inserted into the pivot aperture.

In accordance with another aspect of the present invention, a sheet transport baffle apparatus is provided for guiding sheets along a predetermined path of travel, wherein the sheet transport baffle apparatus includes a pivoting baffle member for permitting access to the path. The sheet transport baffle comprises at least one support frame member defining a pivot aperture and a pivot bushing including a rotatable body defining a pilot slot for cooperative engagement with the pivoting baffle member, wherein the rotatable body is inserted into the pivot aperture.

Figure 2:
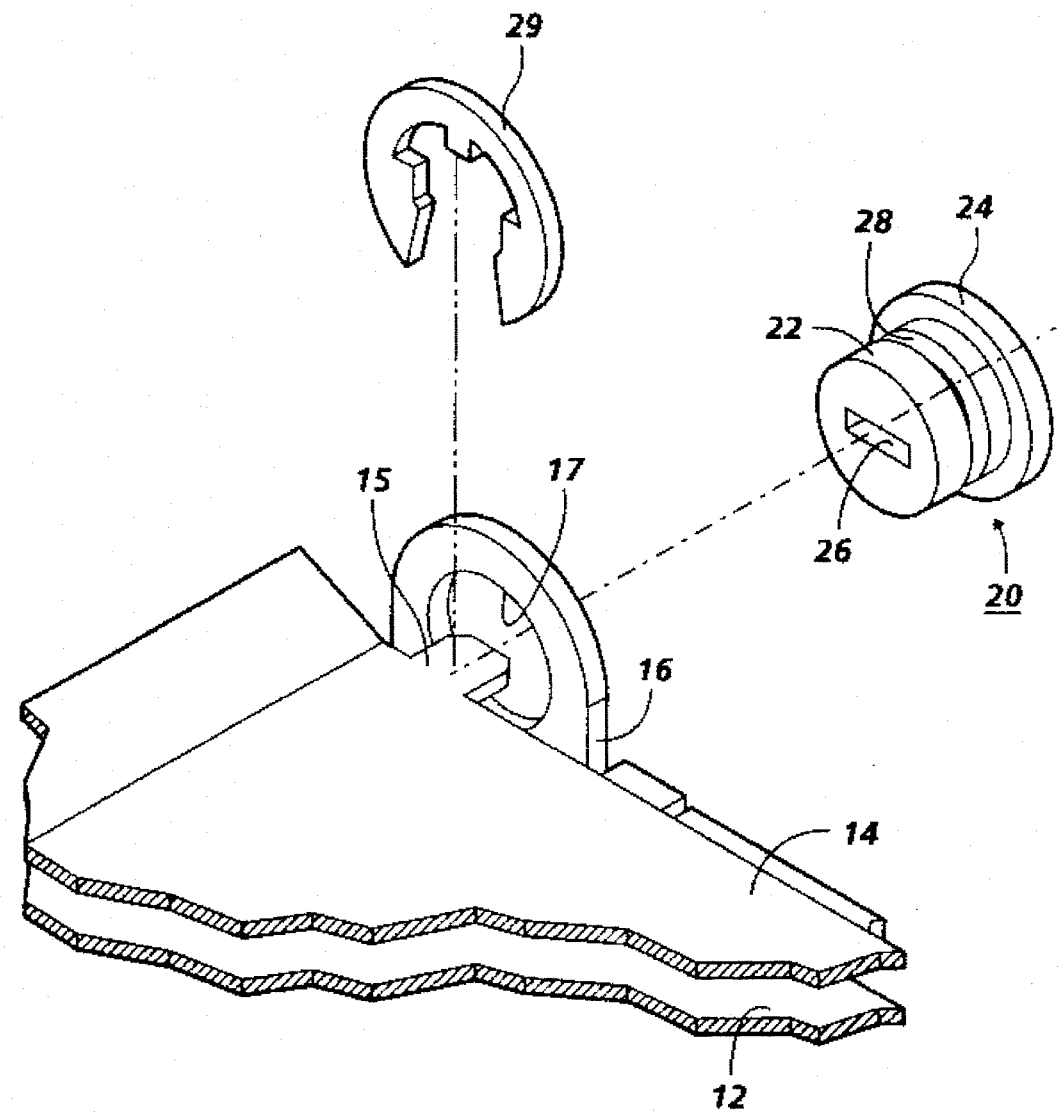

For a better understanding of the present invention, as well as other objects and further features thereof, reference is made to the following drawings and description, wherein like reference numerals have been utilized throughout to identify identical or similar elements. Other aspects and features of the present invention will become apparent as the following description proceeds and upon reference to the drawings, in which:

FIG. 1 is a perspective view of a sheet transport baffle assembly including a pivoting baffle member and a pivot bushing in accordance with the present invention; and FIG. 2 is an exploded perspective view of a pivot mechanism and pivotable assembly incorporated into the sheet transport baffle assembly of FIG. 1, showing the pivot bushing of the present invention and other components making up the pivotable assembly.

Referring initially to FIG. 1, a typical sheet transport baffle assembly 10 is shown, generally comprising a fixed baffle member 12 and a pivoting baffle member 14, capable of swiveling about a pivotable assembly comprising the pivot bushing 20 of the present invention. Each baffle member 12,14 is configured generally parallel to one another in a rigid frame type structure including side frame members 16 positioned opposite portions of each baffle member 12,14. Each baffle member 12,14 typically includes a sloped sheet inlet guide portion 11 angled in opposite directions to one another for providing an enlarged opening to receive sheets or other print substrates traveling along a predetermined paper path. The sheet transport baffle assembly 10 of FIG. 1 exemplifies a well known structure utilized in a typical electrostatographic copying machine, as well as other printing machines, for guiding copy sheets along a path of travel. It will be understood that the transport baffle assembly shown in FIG. 1 represents one of many various apparatus in which the pivot bushing of the present invention may be incorporated. Moreover, it will also be understood that the sheet transport baffle assembly of FIG. 1 may include numerous additional elements, such as, for example, a drive roller, or an idler roller, for providing additional copy sheet transport capabilities.

Pivoting baffle member 14 provides the capability to access the normally enclosed interior region of the sheet transport baffle assembly 10 so as to expose portions of the paper path for jam clearance or other purposes. Thus, in an effort to enhance copy sheet throughout and to decrease downtime associated with the incidence of copy sheet jams coupled with the difficulty of accessing the jammed area or areas for clearing out any damaged or destroyed copy sheets prior to returning a machine to full productivity, a machine operator is provided with a simple means for accessing the paper path in order to permit the removal of any obstruction therefrom. In the illustrative transport baffle 10 of FIG. 1, this pivotable feature is provided by means of a pivot bushing 20 which may be firmly secured in a pivoting mechanism for providing pivotable movement of the pivoting baffle member 14 about a fixed pivot point.

Referring now to FIG. 2, wherein the pivotable assembly of FIG. 1 is shown in an exploded format, pivot bushing 20 comprises a rotatable body 22 for engagement within a pivot aperture 17 formed in frame member 16. The rotatable body 22 includes an end cap 24, and a pilot slot 26 defining an opening along a longitudinal axis of the rotatable body 22. A channel 28 is formed in the periphery of the rotatable body for receiving a securing member 29 which may take the form of a ring member including an open-ended body having a plurality of shoulder segments extending radially inwardly from an inner peripheral surface, as shown in the illustrative embodiment of FIG. 2. It will be understood that the shoulder segments will rest within channel 28 to secure the pivot bushing within the aperture 17.

In order to provide the pivotable assembly, the pivot bushing 20 is inserted into pivot aperture 17 such that a pivot tab 15 formed in pivotable baffle member 14 is aligned with pilot slot 26 for cooperative engagement therebetween. The diameter of body 22 is substantially equivalent to the diameter of pivot aperture 17 for providing firmly secure cooperative engagement therebetween with the pivot bushing 20 remaining freely rotatable within the pivot aperture 17. Conversely, end cap 24 has a diameter greater than the diameter of aperture 17, providing a retaining surface for preventing the pivot bushing 20 from passing through the pivot aperture 17. With the pivot bushing inserted in the pivot aperture 17, the pivot tab 15 is cooperatively engaged with pilot slot 26 and channel 28 is situated on a side opposite the the frame member 16 relative to the position of the end cap 24. A securing member 29 is provided for being inserted into channel 28 so as to secure the pivot bushing 20 into position in the pivotable assembly. Thus, in operation, pilot slot 26 receives the pivot tab 15 of pivoting baffle member 14 while the body 22 is inserted in pivot aperture 17, the body 22 being rotatable in the pivot aperture 17 so as to provide secure pivotable movement of the pivoting baffle member 14 relative to the sheet transport baffle including side frame member 16 as well as the fixed baffle member 12.

In review, it should be clear from the foregoing description and referenced drawings that the apparatus of the present invention includes a pivot bushing which may be firmly secured in a pivoting mechanism for providing pivotable movement of a member in a frame or other apparatus. The pivot bushing includes a rotatable body defining a pilot slot for receiving a pivot tab on the pivotable member. The pivot bushing is insertable within a pivot aperture for rotation therein with the pivot tab engaged within the pivot slot thereof. An end cap and a securing member are also provided for securing the pivot bushing into position in the pivot aperture to assure the structural integrity of the pivotable assembly as a whole.

It is, therefore, apparent that there has been provided, in accordance with the present invention, a pivot bushing and a pivotable assembly which fully satisfies the aspects and advantages set forth herein. While the invention has been described in conjunction with a specific embodiment thereof, it will be evident that many alternatives, modifications, and variations are possible for achieving the desired results. Accordingly, the present invention is intended to embrace all such alternatives, modifications, and variations which may fall within the spirit and scope of the following claims:

I claim:

1. A pivot bushing for providing a secure pivot mechanism in a pivotable assembly in a support frame defining a pivot aperture, said pivot bushing comprising:

a rotatable body defining a pilot slot for cooperative engagement with a pivoting member, said rotatable body being inserted into the pivot aperture;

said rotatable body further including an end cap for providing a retaining surface to prevent the pivot bushing from passing through the pivot aperture.

2. The pivot bushing of claim 1, wherein said rotatable body has a diameter substantially equivalent to a diameter of the pivot aperture.

3. The pivot bushing of claim 1, wherein the pilot slot is situated along a longitudinal axis of said rotatable body.

4. The pivot bushing of claim 1, wherein the pivoting member includes a pivot tab for providing the cooperative engagement between said rotatable body and the pivoting member.

5. The pivot bushing of claim 1, wherein said rotatable body further defines a channel situated along a peripheral surface thereof for receiving a securing member with said rotatable body inserted in the pivot aperture.

6. The pivot bushing of claim 1, including a securing member comprising a ring member having an open-ended body and a plurality of shoulder segments extending radially inwardly from an inner periphery thereof, said shoulder segments resting within the channel of said rotatable body.

7. A sheet transport baffle apparatus for guiding sheets along a predetermined path of travel, including a pivoting baffle member for permitting access to the path, comprising:

at least one support frame member defining a pivot aperture; and a pivot bushing including a rotatable body defining a pilot slot for cooperative engagement with the pivoting baffle member, wherein said rotatable body is inserted into the pivot aperture;

said rotatable body further including an end cap for providing a retaining surface to prevent the pivot bushing from passing through the pivot aperture.

8. The sheet transport baffle apparatus of claim 7, wherein said rotatable body has a diameter substantially equivalent to a diameter of the pivot aperture.

9. The sheet transport baffle apparatus of claim 7, wherein the pilot slot is situated along a longitudinal axis of said rotatable body.

10. The sheet transport baffle apparatus of claim 7, wherein the pivoting baffle member includes a pivot tab extending therefrom for providing the cooperative engagement between said rotatable body and the pivoting member.

11. The sheet transport baffle apparatus of claim 7, wherein said rotatable body further defines a channel situated along a peripheral surface thereof for receiving a securing member with said rotatable body inserted in the pivot aperture.

12. The sheet transport baffle apparatus pivot bushing of claim 7, including a securing member comprising a ring member having an open-ended body and a plurality of shoulder segments extending radially inwardly from an inner periphery thereof, said shoulder segments resting within the channel of said rotatable body.

* * * * *